(12) United States Patent
Ahn et al.

(10) Patent No.: US 7,538,821 B2
(45) Date of Patent: May 26, 2009

(54) DISPLAY APPARATUS TO DETECT LETTER-BOX BOUNDARY AND METHOD OF DISPLAYING IMAGE USING THE SAME

(75) Inventors: Won-seok Ahn, Seoul (KR); Young-ho Lee, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 658 days.

(21) Appl. No.: 11/252,035

(22) Filed: Oct. 18, 2005

(65) Prior Publication Data
US 2006/0139492 A1 Jun. 29, 2006

(30) Foreign Application Priority Data
Dec. 28, 2004 (KR) ............... 10-2004-0113803

(51) Int. Cl.
*H04N 5/46* (2006.01)
(52) U.S. Cl. .................... 348/558; 348/913
(58) Field of Classification Search ........... 348/558, 348/556, 557, 913, 445, 441, 458, 459; H04N 5/46, H04N 7/01, 11/20
See application file for complete search history.

(56) References Cited

U.S. PATENT DOCUMENTS

| | | | |
|---|---|---|---|
| 5,760,840 A | 6/1998 | Tani et al. | |
| 5,956,092 A | 9/1999 | Ebihara et al. | |
| 6,208,385 B1 | 3/2001 | Konishi et al. | |
| 6,259,479 B1 * | 7/2001 | Gadre et al. | 348/441 |
| 6,262,772 B1 | 7/2001 | Shen et al. | |
| 6,366,706 B1 | 4/2002 | Weitbruch | |
| 2004/0119891 A1 | 6/2004 | Barnichon | |

FOREIGN PATENT DOCUMENTS

| | | |
|---|---|---|
| EP | 0 800 311 | 10/1997 |
| JP | 11-27690 | 1/1999 |
| KR | 10-0196553 | 2/1999 |
| KR | 10-0196554 | 2/1999 |

OTHER PUBLICATIONS

Dutch Search Report dated Jun. 19, 2007 issued in Dutch Application No. 1030365.

* cited by examiner

*Primary Examiner*—Sherrie Hsia
(74) *Attorney, Agent, or Firm*—Stanzione & Kim, LLP

(57) ABSTRACT

A display apparatus and a method of displaying an image using the display apparatus. The display apparatus includes a classifier to detect whether a pixel of each line of sequentially input frames of an input image is a black pixel of a letter-box area, a counter to count a number of black pixels detected in each line, a determiner to determine a maximum value of consecutive black pixels in each line, a letter-box detector to detect a boundary of the letter-box area in each frame using the number of black pixels and the maximum value of consecutive black pixels of each line, a boundary determiner to determine final boundaries of the letter-box area by determining a line as one of the final boundaries of the letter-box area if the line is detected as the boundary of the letter-box area a predetermined number of times or more in the frames of the input image, and an adjuster to adjust a size of the input image such that an image area within the final boundaries of the letter-box area is fit to a size of a screen.

41 Claims, 5 Drawing Sheets

DISPLAY APPARATUS TO DETECT LETTER-BOX BOUNDARY AND METHOD OF DISPLAYING IMAGE USING THE SAME

CROSS-REFERENCE TO RELATED APPLICATIONS

This application claims the benefit under 35 U.S.C. § 119 of Korean Patent Application No. 2004-113803 filed Dec. 28, 2004, in the Korean Intellectual Property Office, the disclosure of which is incorporated herein in its entirety by reference.

BACKGROUND OF THE INVENTION

1. Field of the Invention

The present general inventive concept relates to a display apparatus to detect a letter-box boundary and a method of displaying an image using the same, and more particularly, to a display apparatus to detect a letter-box boundary using a run-length of consecutive pixels of a specific color and a method of displaying an image using the same.

2. Description of the Related Art

A letter-box refers to a blank space positioned at upper and lower edges of an area in which an image is displayed, i.e., a non-signal area. In a case in which a letter-box area exists in an input image, an output image is not displayed in the letter-box area but only in an image area other than the letter-box area. Accordingly, a burning effect occurs when displaying the output image.

In a case in which an input image having a letter-box is input to a display apparatus, a size of the image is transformed so that a size of an image area in which the image is displayed except the letter-box area is suitable for a size of a screen of the display apparatus so as to display the image on the screen. This is called auto-wide. A process of detecting a letter-box boundary and dividing a letter-box area and a substantial image area is required during an auto-wide operation.

FIG. 1 is a block diagram illustrating a conventional display apparatus for detecting a letter-box boundary. Referring to FIG. 1, the conventional display apparatus includes an edge determiner 101, a counter 103, a position storage 105, and an image area determiner 107.

The edge determiner 101 determines whether an edge exists in an input image, using luminance Y and chroma C of the input image. The edge determiner 101 determines an area including a sharply decreasing or increasing pixel average value of a predetermined line of the input image as the edge.

The counter 103 counts a number of lines determined to be edges by the edge determiner 101.

If the number of lines determined to be edges is greater than or equal to a predetermined number, the position storage 105 determines the edges to be potential boundaries between a letter-box area and an image area in which an image is substantially displayed and then stores information regarding positions of the lines determined to be the edges. The lines of the input image determined to be the edges are highly likely to be the boundaries between the letter-box area and the image area. Thus, if a predetermined number of edges of sequentially input images are detected at the same positions as the stored position information, the positions may be determined as boundaries of the letter-box area.

The image area determiner 107 determines whether a line determined as an edge is a boundary of the letter-box area, using the information regarding the positions of the lines determined to be the edges stored in the position storage 105. If a position of a line determined to be an edge is detected a predetermined number of times or more, the image area determiner 107 determines the position of the line to be a boundary of the letter-box area. In other words, an area on one side of the line determined to be the boundary is determined to be the letter-box area, and an area on the other side of the line is determined to be the image area.

FIG. 2 is a view illustrating a conventional method of detecting a letter-box area. Referring to FIGS. 1 and 2, in the conventional method, if edges are detected at $N^{th}$ and $N-1^{th}$ lines of an input image, the counter 103 counts a number of edges detected at the $N^{th}$ and $N-1^{th}$ lines of sequentially input images, and the position storage 105 stores information regarding positions of the $N^{th}$ and $N-1^{th}$ lines.

If edges are detected a predetermined number of times or more at the $N^{th}$ and $N-1^{th}$ lines of the images sequentially input following the input image after the edges are detected at the $N^{th}$ and $N-1^{th}$ lines of the input image, the image area determiner 107 determines the $N^{th}$ and $N-1^{th}$ lines to be boundaries of a letter-box area existing in each of the input images.

However, in the conventional method of detecting a letter-box area using detection of an edge between consecutive lines, if a Computer Graphics Interface (CGI), such as a caption or a logo, is positioned in the letter-box area, an edge is not detected at a boundary of the letter-box area due to the caption or the logo. Thus, the boundary of the letter-box area may not be accurately detected.

If a size of an image area except the detected letter-box area is changed to be suitable for a size of a screen of the display apparatus, the size of the image area may be changed several times due to an inaccurate detection of the boundary of the letter-box area. In other words, a position of a predetermined line of an input image may not be determined as a boundary of a letter-box area due to an inaccurate detection of the letter-box area. Thus, the size of the image area may be frequently changed during displaying of an image. The frequent change of the size of the image area may deteriorate temporal image quality.

SUMMARY OF THE INVENTION

Accordingly, the present general inventive concept provides a display apparatus to accurately detect a boundary of a letter-box area from an input image having a letter-box and a method of displaying an image using the display apparatus.

Additional aspects and advantages of the present general inventive concept will be set forth in part in the description which follows and, in part, will be obvious from the description, or may be learned by practice of the general inventive concept.

The foregoing and/or other aspects of the present general inventive concept are achieved by providing a display apparatus including a classifier to detect whether each pixel of each line of sequentially input frames of an input image is a black pixel of a letter-box area, a counter to count a number of black pixels detected in each line, a determiner to determine a maximum value of consecutive black pixels in each line, a letter-box detector to detect a boundary of the letter-box area in each frame using the counted number of black pixels and the determined maximum value of consecutive black pixels in each line, a boundary determiner to determine final boundaries of the letter-box area by determining a line to be one of the final boundaries of the letter-box area if the letter-box detector detects the line as the boundary of the letter-box area a predetermined number of times or more in the frames of the input image, and an adjuster to adjust a size of the input image such that an image area of the input image within the final boundaries of the letter-box area to a size of a screen.

The classifier may compare an absolute value of a difference value between a pixel average value of the letter-box area and a pixel value of each pixel with a first threshold value, and if the absolute value is less than the first threshold value for a pixel, classify the pixel as a black pixel.

The pixel average value of the letter-box area may be one of a pixel average value of a line determined to be in the letter-box area, a pixel average value of a line having the maximum value of the number of black pixels, and a predetermined value.

If the determined maximum value of consecutive black pixels in a line is greater than or equal to a second threshold value and the counted number of black pixels in the line is greater than or equal to a third threshold value, the letter-box detector may determine the line to be in the letter-box area.

The display apparatus may further include a detector to detect a boundary of a computer graphics interface from the letter-box area using at least one of the counted number of black pixels and the determined maximum value of consecutive black pixels of each line.

The computer graphics interface may be a caption or a logo.

The detector may detect a frequency of a position of lines of the input image detected as the boundaries of the letter-box area in the frames of the input image to generate a histogram and may determine a position of a line having a frequency value greater than or equal to a predetermined value in the histogram to be the boundary of the computer graphics interface.

If one of upper and lower boundaries of the letter-box area is constant in the frames of the input image and the other one thereof changes in the frames of the input image, the detector may determine a furthest line from the changing one of the upper and lower boundaries having the frequency value greater than or equal to the predetermined value to be the boundary of the computer graphics interface.

If an absolute value of a value obtained from subtracting the maximum value of consecutive black pixels in a line of the input image from a value obtained from subtracting a number of pixels corresponding to a size of the computer graphics interface from a total number of pixels in the line of the input image is less than a predetermined value, the detector may detect a position of the line to be a boundary of the computer graphics interface.

The detector may compare the counted number of black pixels in each line with the third threshold value to detect a line having the number of black pixels greater than the third threshold value and positioned closest to the image are with respect to other lines having the number of black pixels greater than the third threshold value as a boundary of the computer graphics interface.

If the detector detects the computer graphics interface and the computer graphics interface is set to be displayed, the boundary determiner may determine the boundary of the computer graphics interface to be one of the final boundaries of the letter-box area.

The foregoing and/or other aspect of the present general inventive concept are also achieved by providing a display apparatus including a color space transformer to transform a color space of an input image into a color space representing a predetermined color of a letter-box area, a color detector to detect whether each pixel of each line of sequentially input frames of the input image is a pixel of the predetermined color, a counter to count a number of pixels of the predetermined color detected in each line, a determiner to determine a maximum value of consecutive pixels of the predetermined color in each line, a letter-box detector to detect a boundary of the letter-box area in each frame of the input image using the number of pixels counted by the counter in each line and the maximum value of consecutive pixels determined by the determiner in each line, a boundary determiner to determine final boundaries of the letter-box area of the input image by determining a line to be one of the final boundaries of the letter-box area if the letter-box detector detects the line as the boundary of the letter-box area a predetermined number of times or more in the frames of the input image, and an adjuster to adjust a size of the input image such that an image area of the input image within the final boundaries of the letter-box area is fit to a size of a screen.

The foregoing and/or other aspects of the present general inventive concept are also achieved by providing a display apparatus to display sequentially input frames of an input image on a screen, including a letter-box detecting unit to determine whether each line of pixels of each frame is in a letter-box area based on a color of each pixel and to determine lines of each frame as local letter-box boundaries defining the letter-box area of each frame according to the lines of pixels determined to be in the letter-box area, a boundary detecting unit to determine global letter-box boundaries of the letter-box area of the input image based on the local letter-box boundaries defining the letter-box areas of the frames of the input image, and an adjustment unit to define an image area of each frame according to the determined global letter-box boundaries of the input image and to resize the defined image area to be displayed on the screen.

The foregoing and/or other aspects of the present general inventive concept are also achieved by providing a display apparatus to display an image area of an input image having the image area and a letter-box area on a screen, including a computer graphics interface (CGI) detecting unit to detect a position of a CGI in a letter-box area of an input image, a letter-box detector to detect boundaries separating the letter-box area of the input image from the image area of the input image and to adjust the detected boundaries of the letter-box area according to the detected position of the CGI to include a portion of the letter-box area having the CGI in the image area, and an adjustment unit to adjust a size of the image area including the portion of the letter-box area having the CGI to fit on the screen.

The foregoing and/or other aspects of the present general inventive concept are also achieved by providing a display apparatus to display an sequentially input frames of an input image, including a letter-box area detector to detect a letter-box area in each frame by detecting at least one of a number pixels in each line of each frame of a predetermined letter-box color and a number of consecutive pixels in each frame of the predetermined letter-box color, a computer graphics interface detecting unit to detect a whether a computer graphics interface (CGI) exists in the detected letter-box area of each frame and to determine a position of the CGI in each frame, and a display unit to define a common image area for all of the frames of the input image based on the detected letter-box area in each frame and the determined position of the CGI in each frame and to display the common image area of each frame.

The foregoing and/or other aspects of the present general inventive concept are also achieved by providing a method of displaying an image, including detecting whether each pixel of each line of sequentially input frames of an input image is a black pixel of a letter-box area, counting a number of black pixels detected in each line, detecting a maximum value of consecutive black pixels in each line, detecting a boundary of the letter-box area in each frame using the number of black pixels counted and the maximum value of consecutive black pixels detected in each line, determining final boundaries of the letter-box area by determining a line to be one of the final boundaries of the letter-box area if the line is detected as a boundary of the letter-box area a predetermined number of times or more in the frames of the input image, and adjusting a size of the input image such that an image area within the final boundaries of the letter-box area is fit to a size of a screen.

If an absolute value of a difference value between a pixel average value of the letter-box area and a pixel value of a pixel is less than a first threshold value, the pixel may be determined to be a black pixel of the letter-box area.

The pixel average value of the letter-box area may be one of a pixel average value of a line determined to be in the letter-box area, a pixel average value of a line having the maximum value of consecutive black pixels, and a predetermined value.

If the maximum value of consecutive black pixels in a line is greater than or equal to a second threshold value and the number of black pixels in the line is greater than or equal to a third threshold value, the predetermined line may be determined to be in the letter-box area.

The method may further include detecting a boundary of a computer graphics interface in the letter-box area using at least one of the number of black pixels and the maximum value of consecutive black pixels of each line.

The computer graphics interface may be a caption or a logo.

Frequencies of lines of the input image detected as the boundaries of the letter-box area in the frames of the input image may be detected to generate a histogram and a line of having a frequency value greater than or equal to a predetermined value in the histogram may be determined to be a boundary of the computer graphics interface.

If one of upper and lower boundaries of the letter-box area remains constant in the frames of the input image and the other one thereof changes in the frames of the input image, a position of a furthest line from the image area in a direction of the one of the upper and lower boundaries that changes having the frequency value greater than or equal to the predetermined value may be determined to be the boundary of the computer graphics interface.

If an absolute value of a value obtained from subtracting the maximum value of consecutive black pixels in a line from a value obtained from subtracting a number of pixels corresponding to a size of the computer graphics interface from a total number of pixels in the line is less than a predetermined value, a position of the line h may be determined to be a boundary of the computer graphics interface.

The number of black pixels counted in each line may be compared with the third threshold value to detect a line having the number of black pixels greater than the third threshold value and positioned nearest to the image area with respect to other lines having the number of black pixels greater the third threshold value as a boundary of the computer graphics interface.

If the computer graphics interface is detected and the computer graphics interface is set to be displayed, the boundary of the computer graphics interface may be determined to be one of the final boundaries of the letter-box area.

The foregoing and/or other aspects of the present general inventive concept are also achieved by providing a method of displaying an image, including transforming a color space of an input image into a color space representing a predetermined color of a letter-box area, detecting whether each pixel of each line of sequentially input frames of the input image is a pixel of the predetermined color, counting a number of pixels of the predetermined color detected in each line, detecting a maximum value of consecutive pixels of the predetermined color in each line, detecting a boundary of the letter-box area in each frame using the number of pixels counted and the maximum value of consecutive pixels detected in each line, determining final boundaries of the letter-box area by determining a line to be one of the final boundaries of the letter-box area if the line is detected as the boundary of the letter-box area a predetermined number of times or more in the frames of the input image, and adjusting a size of the input image such that an image area within the final boundaries of the letter-box area fits to a size of a screen.

The foregoing and/or other aspects of the present general inventive concept are also achieved by providing a method of displaying an image, including detecting a local image area and a local letter-box area of each frame of an input image by determining whether each line of each frame is in the local letter-box area based on a color of each pixel in each line, determining a global image area and a global letter-box area of the input image according to the detected local image areas and the detected local letter-box areas of each frame of the input image, and adjusting a size of the global image area to fit to a screen and displaying the adjusted global image area on the screen.

The foregoing and/or other aspects of the present general inventive concept are also achieved by providing a method of displaying an image having an image area and a letter-box area, including detecting a position of a computer graphics interface in the letter-box area of the image, detecting boundaries separating the letter-box area and the image area of the image, adjusting the detected boundaries to include the position of the computer graphics interface in the image area, and adjusting a size of the image area including the position of the computer graphics interface to fit a size of a screen and displaying the adjusted image area including the position of the computer graphics interface on the screen.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
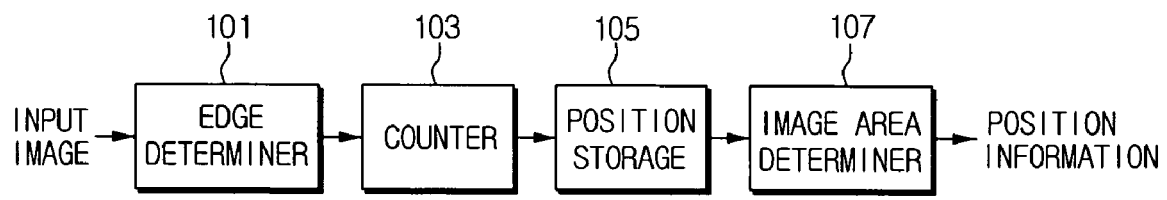
FIG. 1 is a block diagram illustrating a conventional display apparatus for detecting a boundary of a letter-box.
Figure 2:
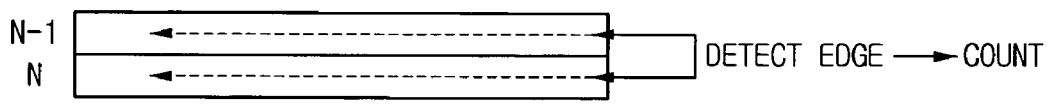
FIG. 2 is a view illustrating a conventional method of detecting a boundary of a letter-box.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 3A:
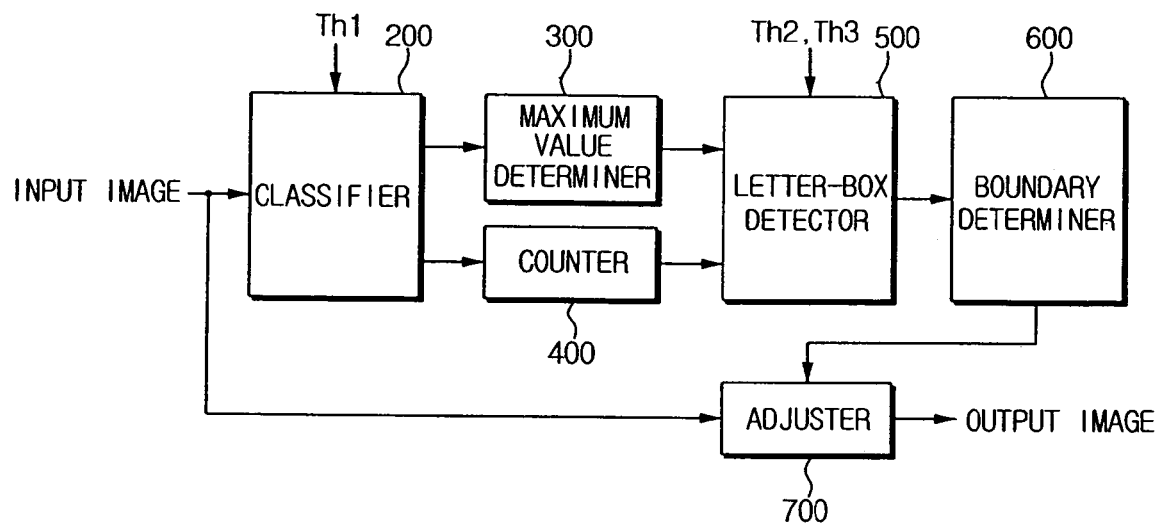
FIGS. 3A through 3C are diagrams illustrating display apparatuses to detect a boundary of a letter-box according to various embodiments of the present general inventive concept.
Figure 3B:
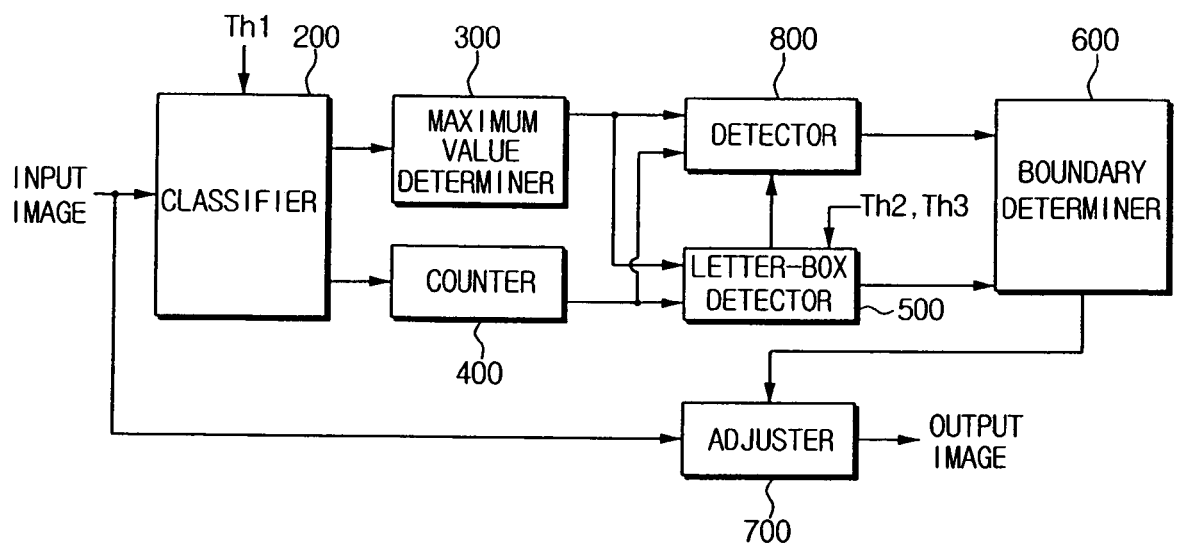
Figure 3C:
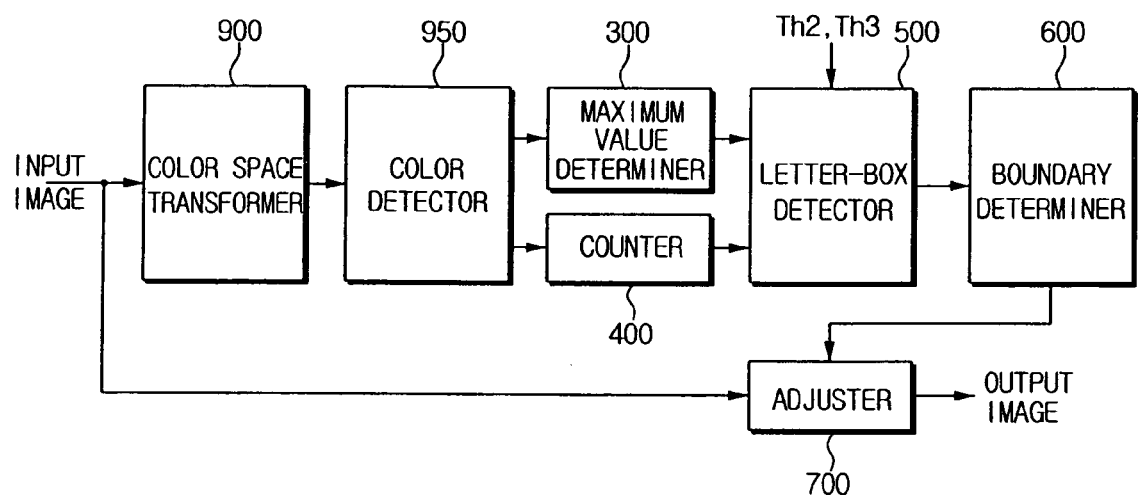

FIGS. 3A through 3C are diagrams illustrating display apparatuses to detect a boundary of a letter-box according to various embodiments of the present general inventive concept. FIGS. 3A and 3B illustrate display apparatuses to detect a boundary of a letter-box by detecting black pixels of an input image, and FIG. 3C illustrates a display apparatus to detect a boundary of a letter-box having a color other than black. Unlike the display apparatus of FIG. 3A, the display apparatus of FIG. 3B additionally includes a detector 800 to detect a caption or a logo.

Referring to FIG. 3A, the display apparatus of this embodiment includes a classifier 200, a maximum value determiner 300, a counter 400, a letter-box detector 500, a boundary determiner 600, and an adjuster 700.

The classifier 200 receives sequentially input frames or fields of an image signal each having lines of pixels and determines whether each pixel of each line is in a letter-box area according to a value of each pixel. In other words, the classifier 200 of the present embodiment detects the value of each pixel to determine whether each pixel is a black pixel.

The classifier 200 detects whether each pixel is a black pixel using an average value of pixels of the letter-box area. If an absolute value of a difference value between the value of a pixel and the average value of the pixels of the letter-box area is less than a first threshold value Th1, the classifier 200 determines that the pixel is a black pixel.

The average value of the pixels of the letter-box area may be an average pixel value of a line determined to be in the letter-box area prior to a line in which the determination is being made as to whether the pixel is a pixel of the letter-box area, an average pixel value of a first line determined to be in the letter-box area in the input image, an average pixel value of a line of the input image having a maximum number of consecutive black pixels, or a predetermined value (i.e., a value of a black pixel).

The classifier 200 may detect whether the pixel is a black pixel of the letter-box area, using dispersion values of the pixels as well as the average value of the pixels of the letter-box area. Here, the dispersion values of the pixels can be calculated using pixels positioned in a line prior to the line in which the determination is being made as to whether the pixel is a pixel of the letter-box area.

If the absolute value of the difference value between the value of a pixel and the average value of the pixels of the letter-box area is less than the first threshold value Th1 and the dispersion values are greater than or equal to a predetermined value, the line in which the pixel is positioned is not determined to be in the letter-box area. Since the dispersion values are greater than or equal to the predetermined value, even though the pixel is determined to be a black pixel, the pixel determined to be a black pixel is not positioned in the letter-box area. This is because the pixel is generated by noise, and thus is determined to be one of a small number of black pixels existing in a line of an image area of the input image.

The counter 400 counts a number of black pixels detected in each line of the input image using the results of the classifier 200. In other words, if the classifier 200 detects a pixel as a black pixel, the counter 400 counts the detected pixel in the number of black pixels detected from the corresponding line of the input image.

The maximum value determiner 300 determines a maximum value of a number of consecutive black pixels detected in each of the lines of the input image. In other words, the maximum value determiner 300 determines a run-length maximum value of the black pixels detected in each of the lines of the input image using the results of the classifier 200.

The letter-box detector 500 detects upper and lower letter-box areas in each of the sequentially input frames or fields of the input image using the results of at least one of the counter 400 and the maximum value determiner 300. If the letter-box detector 500 detects the letter-box areas using the results of the counter 400 and the number of black pixels counted by the counter 400 in a line of a frame or field is greater than or equal to a second threshold value Th2, the letter-box detector 500 determines that the line is in one of the letter-box areas of the frame or field. The letter-box detector 500 determines whether each line of a frame or field is in one of the letter box areas of the frame or field to detect boundaries of the letter-box areas of each frame or field that separate the letter box areas from an image area.

If the letter-box detector 500 detects the letter-box areas using the results of the maximum value determiner 300 and the run-length maximum value of the consecutive black pixels in a line of a frame or field detected by the maximum value determiner 300 is greater than or equal to a third threshold value Th3, the letter-box detector 500 determines that the line is in one of the letter-box areas of the frame or field. The letter-box detector 500 determines whether each line of a frame or field is in one of the letter box areas of the frame or field to detect the boundaries of the letter-box areas of each frame or field that separate the letter box areas from an image area.

The boundary determiner 600 detects final letter-box boundaries of the input image using the lines detected as the boundaries of the letter-box areas in each frame or field of the input image. In other words, the boundary determiner 600 analyzes changes in coordinates of the boundaries detected in the sequentially input frames or fields of the input image to determine the final boundaries of the letter-box area of the input image. If a line of an input image is detected as a boundary of a letter-box area a predetermined number of times or more in the frames or fields of the input image, the boundary determiner 600 determines the line as a final boundary of the letter-box area of the input image.

However, if a line of the input image is detected as a boundary of a letter-box area less than the predetermined number of times in the frames or fields of the input image, the boundary determiner 600 does not determine the line to be a final boundary of a letter-box area of the input image. If a line that is detected as a boundary of a letter-box area less than the predetermined number of times in the frames or fields was determined to be a final boundary of a letter-box area, a size of an image would be frequently changed during displaying of the image.

The adjuster 700 adjusts a size of the image area of the input image other than the letter-box area such that the image area of the input image is suitable for a size of a screen of the display apparatus. The adjuster 700 uses the final boundaries of the letter-box areas determined by the boundary determiner 600 to define the image area. In other words, the adjuster 700 classifies the frames or fields of the input image into the letter-box area and the image area using the final boundaries of the letter-box areas determined by the boundary determiner 600 and then adjusts the size of the input image in the image area so as to be suitable for the size of the screen of the display apparatus.

Referring to FIG. 3B, the display apparatus of FIG. 3B is similar to the display apparatus of FIG. 3A and further includes a detector 800 to detect a boundary of a caption or a logo. The classifier 200, the maximum value determiner 300, the counter 400, the letter-box detector 500, and the adjuster 700 perform substantially the same operations as those illustrated in FIG. 3A.

The detector 800 detects whether the letter-box area includes a Computer Graphics Interface (CGI), such as a caption or a logo, and detects a boundary of the caption or the logo. The detector 800 detects the boundary of the caption or the logo using a histogram generated by calculating a number of times a boundary of the letter-box is detected depending on coordinates of a boundary of the letter-box detected from each field or frame of the input image.

The detector 800 may detect the boundary and a size of the caption or the logo using the results of the maximum value determiner 300 and the counter 400. The detector 400 calculates an absolute value of a value obtained from subtracting the run-length maximum value of a line of the input image from a value obtained from subtracting an estimated size of the logo from a horizontal size of the whole input image, i.e., a total number of pixels in the line of the input image. If the calculated absolute value is less than a predetermined value, the detector 800 determines that the caption or the logo is positioned in the line of the input image having the run-length maximum value. Here, the line of the input image having the run-length maximum value may be determined as a starting position of the logo protruding from the image area into the letter-box area. That is, the logo may be partially in the image area and partially in the letter-box area, and the line of the input image having the run-length maximum value may be a boundary of the letter-box area.

The detector 800 determines a line having the number of black pixels counted by the counter 400 greater than the second threshold value Th2 used during the detection of the letter-box areas by the letter-box detector 500 as an ending boundary of the logo. If the logo is positioned in the upper letter-box area, the detector 800 determines a line having a number of black pixels greater than the second threshold value Th2 and positioned lowest (i.e., closest to the image area) relative to other lines having a number of black pixels greater than the second threshold value Th2 as the ending boundary of the logo. If the logo is positioned in the lower letter-box area, the detector 800 determines a line having the number of black pixels greater than the second threshold value Th2 and positioned highest (i.e., closest to the image area) relative to other lines having a number of black pixels greater than the second threshold value Th2 as the ending boundary of the logo.

The boundary determiner 600 determines final boundaries of the letter-box areas using information regarding the boundary of the caption or the logo existing in the letter-box area detected by the detector 800. If a caption existing in the letter-box area is set to be displayed, the boundary determiner 600 determines the boundary of the caption detected by the detector 800 as the final boundary of the letter-box area in which the caption is displayed. If a logo existing in the letter-box area is set to be displayed, the boundary determiner 600 determines the boundary of the logo detected by the detector 800 as the final boundary of the letter-box area in which the logo is displayed.

Since the boundary of the caption or the logo is determined as the final boundary separating the image area and the letter-box area, a portion of the letter-box area including the caption or the logo therein is determined to be in the image area.

Referring to FIG. 3C, the display apparatus of FIG. 3C includes a color space transformer 900 and a color detector 950 in addition to the maximum value determiner 300, the counter 400, the letter-box detector 500, the boundary determiner 600, and the adjuster 700. The display apparatuses of FIGS. 3A and 3B are used to detect a boundary of a letter-box area including black pixels. However, the display apparatus of FIG. 3C is used to detect a boundary of a letter-box area that can include color pixels, such as blue pixels other than black pixels. The maximum value determiner 300, the counter 400, the letter-box detector 500, the boundary determiner 600, and the adjuster 700 of the display apparatus of FIG. 3C perform substantially the same operations as those illustrated in FIGS. 3A and 3B.

The color space transformer 900 transforms an input image on an YCbCr color space into a color space such as XYZ, RGB, or the like.

The color detector 950 detects a color of a letter-box area and then detects whether each pixel of an input image is a pixel of the detected color. Here, the color of the letter-box area may be a predetermined color.

Figure 4A:
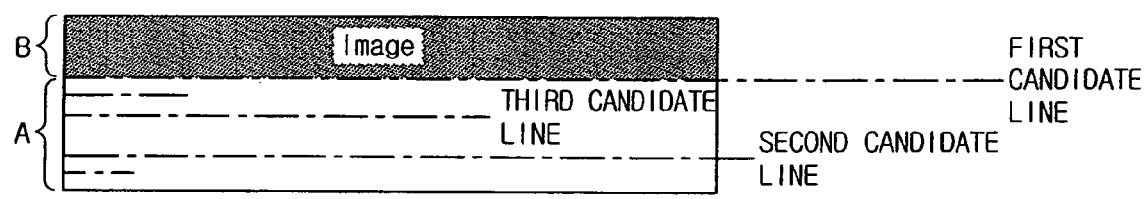
FIGS. 4A and 4B are views illustrating operations of a detector of the display apparatus of FIG. 3B.
Figure 4B:
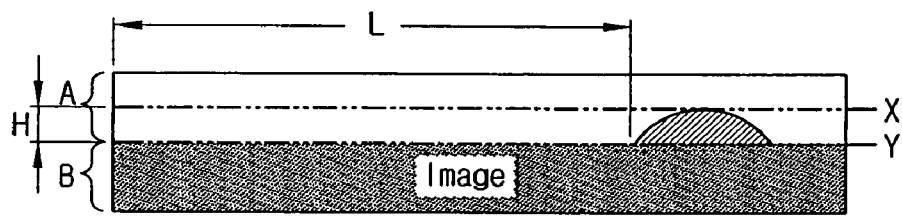

FIGS. 4A and 4B are views illustrating operations of the detector 800 of FIG. 3B. FIG. 4A is a view illustrating operations of the detector 800 detecting a caption in a lower letter-box area, and FIG. 4B is a view illustrating the operations of the detector 800 detecting a logo in an upper letter-box area. In FIGS. 4A and 4B, A denotes a letter-box area, and B denotes an image area in which a substantial image is displayed.

Referring to FIG. 4A, the detector 800 generates a histogram with respect to a number of times a letter-box boundary is detected in a field or frame of the input image depending on a position of the detected letter-box boundary in each field or frame of the input image. The detector 800 detects whether a caption exists and a boundary of the caption using the generated histogram. Here, a first axis (vertical in FIG. 4A) of the histogram denotes the position of the letter-box boundary detected in each field or frame of the input image, and a second axis (horizontal in FIG. 4A) of the histogram denotes a frequency of detecting the letter-box boundary at each position.

If boundary coordinates of one of upper and lower boundaries at upper and lower edges of the letter-box area detected in each field or frame of the input image are uniformly maintained while boundary coordinates of the other one of the upper and lower boundaries are changed, the detector 800 can determine that the caption exists in the letter-box area using the results of the maximum value determiner 300 and the counter 400. The coordinates of the boundaries of one of the upper and lower letter-box areas can be changed by a signal to input the caption to the letter-box area.

If a frequency value of a detected boundary is less than a predetermined value in the histogram, it is determined that the boundary of the letter-box is changed by an error. Of the boundaries of the letter-box area having frequency values greater than or equal to the predetermined value in the histogram, the boundary positioned at the furthest position from the image area B is determined to be the boundary of the caption.

The boundary of the caption may vary in each field or frame of the input image. Accordingly, the boundary of the caption positioned furthest from the image area B is determined to be a final boundary of the caption to minimize a change of the size of the input image so as to display the whole portion of the caption in the image area. When the caption is detected in the lower letter-box area, a line having a frequency value in the histogram greater than or equal to the predetermined value and positioned lowest with respect to other lines having frequency values in the histogram greater than or equal to the predetermined value is determined to be the final boundary of the caption. However, if the caption is detected in the upper letter-box area, a line having a frequency value greater than or equal to the predetermined value in the histogram and positioned highest with respect to other lines having frequency values in the histogram greater than or equal to the predetermined value is determined to be the final boundary of the caption.

For example, if a boundaries of the lower letter-box area in the frames or fields of the input image having the frequency value greater than or equal to the predetermined value in the histogram are first, second, and third candidate lines, as illustrated in FIG. 4A, the second candidate line positioned lowest in the lower letter-box area with respect to the first and third candidate lines is determined as the final boundary of the caption. In this case, since the caption exists in the lower letter-box area, the boundary determiner 600 determines the second candidate line not the first candidate line detected by the letter-box detector 500 as the final boundary of the letter-box.

Referring to FIG. 4B, the detector 800 may detect a boundary and a size of a logo using the results of the maximum value determiner 300 and the counter 400. Here, H denotes a height of the logo detected by the detector 800, and L denotes a maximum value of a run-length. Also, X denotes an ending boundary of the logo detected by using the number of black pixels counted by the counter 400, and Y denotes a starting boundary of the logo protruding from the image area into the letter-box area. The starting boundary Y of the logo can be detected by using the run-length maximum value L determined by the maximum value determiner 300.

The run-length maximum value L is a maximum value of consecutive black pixels in a line. A first value obtained from subtracting an estimated horizontal size of the logo from a horizontal size of a whole image (i.e., a total number of pixels in a line) is compared with the run-length maximum value L of the line. If a second value obtained from subtracting the run-length maximum value L from the first value is less than a predetermined value, it may be determined that a logo is positioned in the line of the input image having the run-length maximum value L. In other words, if all of the pixels remaining after subtracting the estimated horizontal size of the logo from the horizontal size of the whole image are black pixels, it may be determined that the logo exists in the letter-box area. Thus, the line having the run-length maximum value L can be determined to be the starting boundary Y of the logo protruding from the image area into the letter-box area.

A line of the letter-box area having the number of black pixels counted by the counter 400 greater than or equal to the second threshold value Th2 and positioned closest to the image area with respect to other lines having a number of black pixels greater than or equal to the second threshold value Th2 is to determined to be the ending boundary of the logo. In other words, if it is determined that the logo is positioned in the upper letter-box area, line X is positioned lowest of the lines in the letter-box area having the counted number of black pixels greater than the second threshold value Th2 and is detected as the boundary of the logo.

If the logo is not set to be displayed, the boundary determiner 600 determines the line Y as the final boundary of the letter-box without considering that the logo exists in the letter-box area. However, if the logo is set to be displayed on a screen, the line X that is the ending boundary of the logo in the letter-box area is determined to be the final boundary of the letter-box area such that a portion of the letter-box area including the logo protruding from the image area is included within the image area.

Here, a size of the logo can be obtained by subtracting a position of the ending boundary X of the logo from the starting boundary Y of the logo protruding from the image area into the letter-box area. If the size of the logo is smaller than a predetermined value, the line in the starting position Y can be determined as the final boundary of the letter-box area without considering the logo existing in the letter-box area.

Figure 5A:
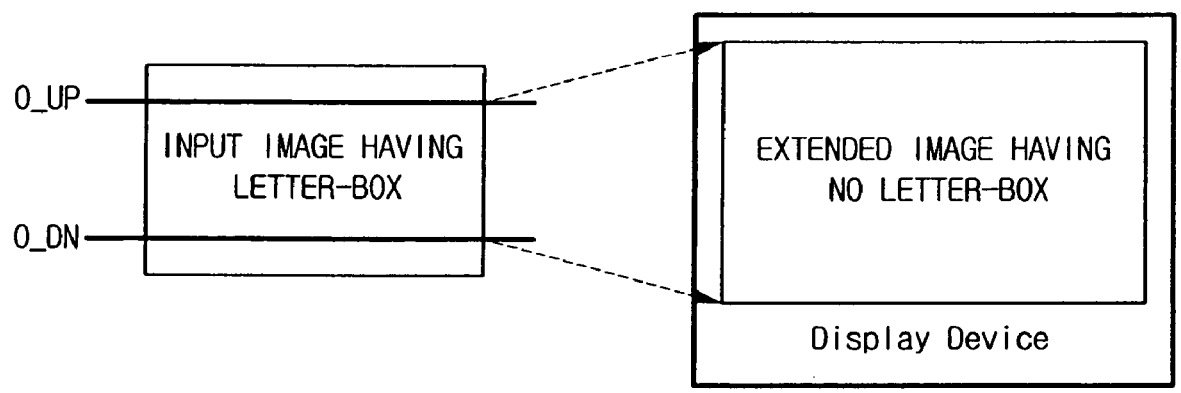
FIGS. 5A and 5B are views illustrating operations of an adjuster of the display apparatuses of FIGS. 3A through 3C.
Figure 5B:
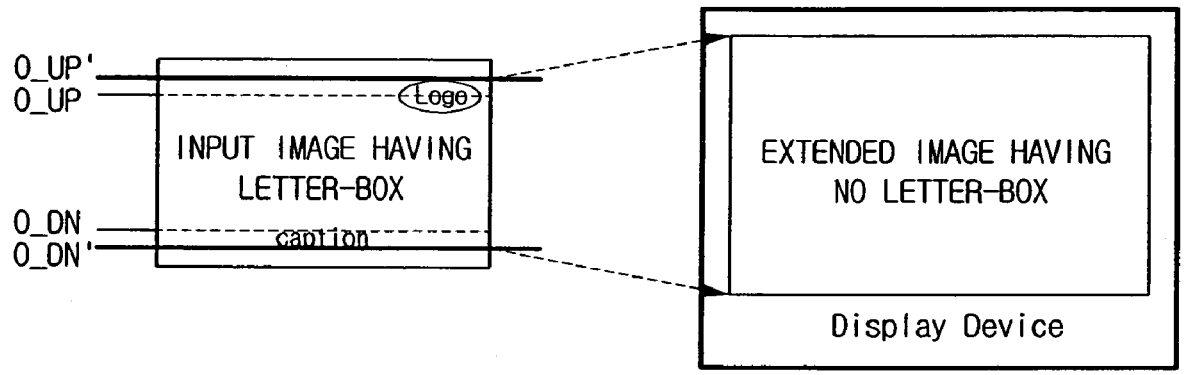

FIGS. 5A and 5B are views illustrating operations of the adjuster 700 of FIGS. 3A through 3C. FIG. 5A illustrates the adjuster 700 adjusting an input image including a letter-box area not having a caption or a logo, and FIG. 5B illustrates the adjuster 700 adjusting an input image including a letter-box area having a caption or a logo.

In FIGS. 5A and 5B, O_UP denotes an upper boundary of the letter-box area, and O_DN denotes a lower boundary of the letter-box area. Also, O_UP' denotes an adjusted upper boundary of the letter-box area determined when a logo exists at an upper letter-box area, and O_DN' denotes an adjusted lower boundary of the letter-box area determined when a caption exists at a lower letter-box area.

Referring to FIG. 5A, if a caption or a logo does not exist in a letter-box area of an input image, the adjuster 700 adjusts a size of the input image using the results of the maximum value determiner 300 and the counter 400 such that the image area defined within the upper and lower boundaries O_UP and O_DN of the letter-box area is fit to the size of the screen of the display apparatus.

Referring to FIG. 5B, if the caption or the logo exists in the letter-box area of the input image, the adjuster 700 adjusts the size of the input image using the results of the maximum value determiner 300, the counter 400, and the detector 800 such that the image area defined within the adjusted upper and lower boundaries O_UP' and O_DN' of the letter-box area is fit to the size of the screen of the display apparatus.

If the caption or the logo exists in the letter-box area of the input image, the boundary determiner 600 changes the boundaries O_UP and O_DN of the letter-box area into the adjusted boundaries O_UP' and O_DN', and the adjuster 700 adjusts the size of the input image such that the image area defined within the adjusted boundaries O_UP' and O_DN' is fit to the size of the screen of the display apparatus. In other words, the image area in which a substantial area is displayed is extended outward to the boundaries of the caption or the logo detected by the detector 800 to display the caption or the logo on the screen with the image area.

However, if the caption or the logo is not set to be displayed, the boundary determiner 600 does not determine the boundary of the caption or the logo as the boundary of the letter-box in spite of the detection of the caption or the logo in the letter-box area. Thus, as in the case where the caption or the logo is not detected, the adjuster 700 adjusts the size of the input image so that the image area defined by the boundaries O_UP and O_DN is fit to the size of the screen of the display apparatus.

Figure 6:
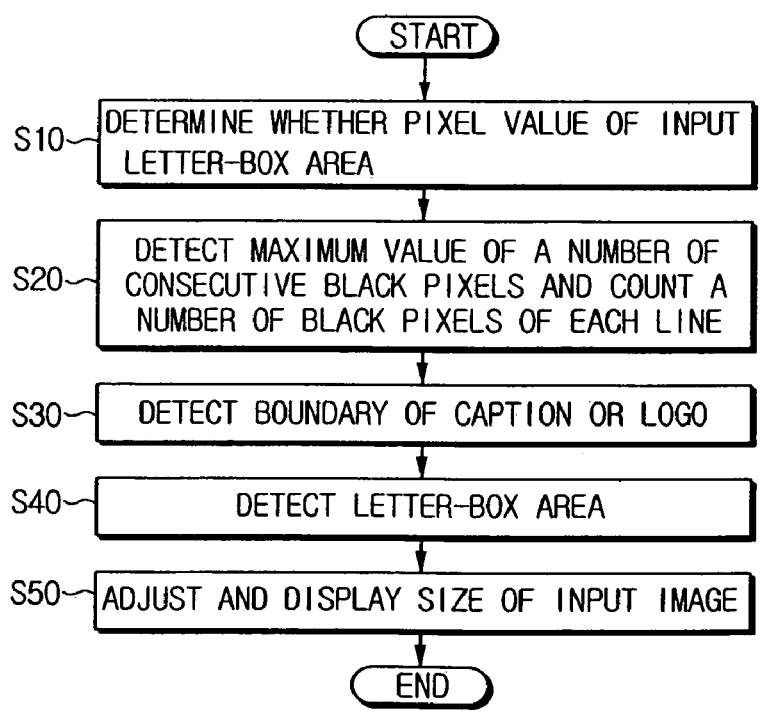
FIG. 6 is a flowchart illustrating a method of displaying an image according to an embodiment of the present general inventive concept.

FIG. 6 is a flowchart illustrating a method of displaying an image using a display apparatus according to an embodiment of the present general inventive concept.

At operation S10, a determination is made as to whether each pixel of an input image is in a letter-box area. In other words, a determination is made as to whether a pixel of a line of the input image is a black pixel. The determination as to whether the pixel of the line of the input image is the black pixel is made using a pixel average value of the letter-box area, a dispersion value of pixels of a line prior to the line, and a first threshold value Th1.

The pixel average value of the letter-box area may be a pixel average value of a line detected as being in the letter-box area immediately prior to the line in the input image, a pixel average value of a first line detected as being in the letter-box area in the input image, a pixel average value of a line of the input image having a run-length maximum value, or a predetermined value.

An absolute value of a difference value between each pixel value of each line of the input image and the pixel average value of the letter-box area is calculated. If the absolute value is less than the first threshold value Th1 for a pixel, the pixel is classified as a black pixel.

Black pixels in the letter-box area may be detected using the dispersion value of the pixels of the line prior to the line. If the dispersion value is greater than a predetermined value, it may be determined that a number of black pixels of the line is small. Accordingly, it may be determined that the black pixels detected in the line are not black pixels existing in the letter-box area but black pixels generated by noise or the like. Therefore a pixel may be classified as a black pixel positioned in the letter-box area only if the dispersion value is less than the predetermined value and the absolute value is less than the first threshold value Th1 for the pixel.

At operation S20, a run-length maximum value of consecutive black pixels detected in each line is determined and a number of black pixels of each line is counted. The run-length maximum value is a number of input pixels sequentially detected as black pixels in each line, and the number of detected black pixels is counted in each line.

If a CGI, such as a caption or a logo, exists in the letter-box area, at operation S30, a boundary of the caption or the logo is detected. The caption can be positioned at a lower letter-box area, and the logo can be positioned in an upper letter-box area. A process of detecting the boundaries of the caption and the logo positioned in the lower and upper letter-box areas will now be described.

The boundary of the caption positioned at the lower letter-box area is detected using a histogram generated by calculating a frequency of detections of letter-box boundaries in sequentially input fields or frames of the input image depending on coordinates of the letter-box boundaries detected in each field or frame of the input image. If coordinates of a boundary of the upper letter-box area detected in each field or each frame of the input image are uniformly maintained and coordinates of a boundary of the lower letter-box area are changed in the fields or frames, it may be determined that the caption is positioned in the lower letter-box area.

In this case, a line having coordinates with a frequency value greater than or equal to a predetermined value in the histogram and positioned lowest with respect to other lines having frequency values greater than or equal to the predetermined value in the histogram is determined to be the boundary of the caption. If the caption is positioned in the upper letter-box area, a line having coordinates with a frequency value greater than or equal to the predetermined value in the histogram and being positioned highest with respect to other lines having frequency values greater than or equal to the predetermined value in the histogram is determined to be the boundary of the caption. However, if the frequency value of a line is less than the predetermined value in the histogram, it is determined that the boundary of the letter-box area is changed to that line by an error, not by the caption.

The boundary of the logo positioned in the upper letter-box area is detected using the run-length maximum value and a number of black pixels counted in each line. A starting boundary of the logo is detected using the run-length maximum value of consecutive black pixels. A first value obtained from subtracting an estimated size of the logo from a horizontal size of a whole input image is compared with the run-length maximum value of a line. If the logo is positioned in the line of the letter-box area, the number of black pixels in that line is reduced by the position of the logo. Accordingly, if the first value coincides with the run-length maximum value of the line, it may be determined that the logo exists in that line of the letter-box area.

If a second value obtained from subtracting the run-length maximum value from the first value is less than a predetermined value, it may be determined that the logo exists in the line of the input image having the run-length maximum value. In other words, if the first value obtained from subtracting the estimated size of the logo from the horizontal size of the whole input image indicates that all pixels in the line that are not part of the logo are black pixels, it may be determined that the logo exits in the letter-box area. A line in which the second value is less than the predetermined value and positioned in the letter-box area adjacent to the image area corresponds to the starting boundary of the logo protruding from an image area into the upper letter-box area.

The ending boundary of the logo can be detected using the counted number of black pixels. Coordinates of a line of the input image having the counted number of black pixels is greater than the second threshold value Th2 and positioned closest to the image area with respect to other lines in which the counted number of black pixels is greater than the second threshold value Th2 may be determined as the ending boundary of the logo. For example, coordinates of a line in the letter-box area having the number of black pixels greater than or equal to the second threshold value Th2 and positioned lowest with respect to other lines having the number of black pixels greater than or equal to the second threshold value correspond to a last line of the logo in the upper letter-box area. The logo is positioned on lines between the ending boundary and the image area. Accordingly, the lines positioned between the ending boundary and the image area do not have a number of black pixels greater than or equal to the second threshold value Th2.

The ending boundary of the logo can be detected using the run-length maximum value. In this case, a line of the input image having the run-length maximum value greater than or equal to a third threshold value Th3 and positioned closest to the image area with respect to other lines having the run-length maximum value greater than or equal to the third threshold value Th3 may be detected as the ending boundary of the logo.

A difference between the line of the letter-box area detected as the starting boundary and the line of the letter-box area detected as the ending boundary is a vertical size of the logo positioned in the letter-box area.

At operation S40, final boundaries of the letter-box area are detected using the detected boundary of the caption or the logo. If the boundary of the caption or the logo is not detected, changes in coordinates of the boundaries of the letter-box area detected from each field or frame of the input image are analyzed to determine final boundaries of the letter-box area. If a line of the input image is detected as a boundary of a letter-box area a predetermined number of times or more in the fields or frames of the input image, the line is determined as a final boundary of the letter-box area.

However, if lines of the input image are detected as boundaries of letter-box areas less than the predetermined number of times in the frames or fields of the input image, the lines are not determined to be final boundaries of the letter-box area of the input image. If a boundary of the letter-box area that is detected less than the predetermined number of times in the frames or fields of the input image is determined to be a final boundary of the letter-box area of the input image, a size of the input image would have to be frequently changed during display of the input image.

If the caption or the logo is detected in the letter-box area and set to be displayed, the boundaries of the letter-box area are adjusted to include the caption or the logo in the image area in which a substantial image is displayed. In other words, the boundary of the caption or the logo positioned in the letter-box area is determined to be a final boundary of the letter-box area.

However, if the caption or the logo is not set to be displayed, the image area is determined without considering the caption or the logo. In other words, the boundaries of the letter-box areas detected by the letter-box detector 500 are used to determine the final boundaries of the letter-box area without considering the caption or the logo positioned in the letter-box area.

At operation S50, a size of the input image is adjusted using the final boundaries of the letter-box area, and then the input image is displayed. The size of the input image is adjusted such that the image area other than the letter-box area is fit to the size of the screen of the display apparatus so as to display the image area of input image on the screen. If the caption or the logo is detected from the letter-box area, the caption or the logo positioned in the letter-box area is also included in the image area that is adjusted to fit the size of the screen of the display apparatus so as to display caption or the logo with the image area.

As described above, the determination is made as to whether each pixel of each line of the input image is a black pixel to detect the letter-box area. However, if the letter-box area a color other than black, such as blue, a color space of the input image can be transformed into RGB and XYZ spaces and a number of pixels having the other color can be counted so as to detect the boundaries of the letter-box area. In other words, the color space of the input image can be transformed into a color space representing the color of the letter-box area to detect the letter-box area.

As described above, in a display apparatus to detect a letter-box boundary and a method of displaying an image using the display apparatus according to embodiments the present general inventive concept, the letter-box boundary can be accurately detected using a run-length maximum value that is a maximum value of consecutive black pixels or a number of black pixels counted in each line of an input image.

The accurate detection of the letter-box area can contribute to prevention of deterioration of temporal image quality caused by frequently changing a size of an image to be fit to a screen of the display apparatus.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A display apparatus comprising:
   a classifier to detect whether each pixel of each line of sequentially input frames of an input image is a black pixel of a letter-box area;
   a counter to count a number of black pixels detected in each line;
   a determiner to determine a maximum value of consecutive black pixels in each line;
   a letter-box detector to detect a boundary of the letter-box area in each frame using the counted number of black pixels and the determined maximum value in each line;
   a boundary determiner to determine final boundaries of the letter-box area by determining a line to be one of the final boundaries of the letter-box area if the letter box detector detects the line as the boundary of the letter-box area a predetermined number of times or more in the frames of the input image; and
   an adjuster to adjust a size of the input image such that an image area within the final boundaries of the letter-box area is fit to a size of a screen.

2. The display apparatus of claim 1, wherein the classifier compares an absolute value of a difference value between a pixel average value of the letter-box area and a pixel value of each pixel with a first threshold value, and if the absolute value is less than the first threshold value for a pixel, classifies the pixel as a black pixel.

3. The display apparatus of claim 2, wherein the pixel average value of the letter-box area comprises one of a pixel average value of line determined to be in the letter-box area, a pixel average value of a line having the maximum value of consecutive black pixels, and a predetermined value.

4. The display apparatus of claim 2, wherein the clasifier compares a dispersion value of a pixel classified as a black pixel to a predetermined value and determines that the black pixel is in the letter box area when the dispersion value is less than the predetermined value.

5. The display apparatus of claim 1, wherein if the determined maximum value of consecutive black pixels of a line is greater than or equal to a second threshold value and the counted number of black pixels in the line is greater than or equal to a third threshold value, the letter-box detector determines the line to be in the letter-box area.

6. The display apparatus of claim 1, further comprising:
   a detector to detect a boundary of a computer graphics interface in the letter-box area using at least one of the counted number of black pixels and the determined maximum value of consecutive black pixels of each line.

7. The display apparatus of claim 6, wherein the computer graphics interface comprises one of a caption and a log.

8. The display apparatus of claim 6, wherein the detector detects a frequency of a position of lines of the input image detected as the boundaries of the letter-box area in the frames of the input image to generate a histogram and determines a position of a line having a frequency value greater than or equal to a predetermined value in the histogram to be the boundary of the computer graphics interface.

9. The display apparatus of claim 8, wherein if one of upper and lower boundaries of the letter-box area is constant in the frames of the input image and the other one thereof is changes in the frames of the input image, the detector determines a furthest line from the changing one of the upper and lower bound ribs of the letter-box area having the frequency value greater than or equal to the predetermined value to be the boundary of the computer graphics interface.

10. The display apparatus of claim 6, wherein if an absolute value of a value obtained from subtracting the determined maximum value of consecutive black pixels in a line of the input image from a value obtained from subtracting a number of pixels corresponding to a size of the computer graphics interface from a total number of pixels in the line of the input image is less than a predetermined value, the detector detects a position of the line as a boundary of the computer graphics interface.

11. The display apparatus of claim 6, wherein the detector compares the number of black pixels counted in each line with a predetermined threshold value to detect a line having the number of black pixels greater than the predetermined threshold value and positioned closest to the image area with respect to other lines having the number of black pixels greater than the predetermined threshold value as a boundary of the computer graphics interface.

12. The display apparatus of claim 6, wherein if the detector detects the computer graphics interface and the computer graphics interface is set to be displayed, the boundary determiner determines the boundary of the computer graphics interface to be one of the final boundaries of the letter-box area.

13. A display apparatus comprising:
   a color space transformer to transform a color space of an input image into a color space representing a predetermined color of a letter-box area;
   a color detector to detect whether each pixel of each line of sequentially input frames of the input image is a pixel of the predetermined color;
   a counter to count a number of pixels of the predetermined color detected in the each line;
   a determiner to determine a maximum value of consecutive pixels of the predetermined color in each line;
   a letter-box detector to detect a boundary of the letter-box area in each frame of the input image using the number of pixels counted by the counter in each line and the maximum value of consecutive pixels determined by the determiner in each line;
   a boundary determiner to determine final boundaries the letter-box area of the input image by determining a line to be one of the final boundaries of the letter-box detector detects the line as the boundary of the letter-box area a predetermined number of times or more in the frames of the input image; and
   an adjuster to adjust a size of the input image such that an image area within the final boundaries of the letter-box area is fit to a size of a screen.

14. A display apparatus to display sequentially input frames of an input image on a screen, comprising:
   a letter-box detecting unit to determine whether each line of pixels of each frame is in a letter-box area based on a color of each pixel and to determine lines of each frame as local letter-box boundaries defining the letter-box area of each frame according to the lines of pixels determined to be in the letter-box area;
   a boundary detecting unit to determine global letter-box boundaries of the letter-box area of the input image based on the local letter-box boundaries defining the letter-box areas of the frames of the input image; and
   an adjustment unit to define an image area of each frame according to the determined global letter-box boundaries of the input image and to resize the defined image area to be displayed on the screen.

15. The display apparatus of claim 14, wherein the letter-box detecting unit compares the color of each pixel with a predetermined color of the letter-box area to determine whether each pixel has the same color as the letter-box area.

16. The display apparatus of claim 15, wherein the letter-box detecting unit determines whether a line of pixels is in the letter-box area based on one of a number of pixels in the line determined to have the same color as the letter-box area and a maximum run-length of consecutive pixels in the line determined to have the same color as the letter-box area.

17. The display apparatus of claim 14, wherein the boundary detecting unit determines lines of the input image determined to be the global letter-box boundaries of a predetermined number of frames or more to be the global letter-box boundaries.

18. The display apparatus of claim 14, wherein the adjustment unit resizes the defined image area to be displayed on the screen without the letter-box area.

19. The display apparatus of claim 14, further comprising:
   a computer graphic interface detecting unit to detect whether a computer graphics interface exists in the letter-box area and to determine boundaries of the computer graphics interface when the computer graphics interface exists in the letter-box area, wherein the boundary detecting unit determined global letter-box boundaries based on the local letter-box boundaries and the determined boundaries of the computer graphics interface.

20. The display of claim 19, wherein the boundary detecting unit determines the global letter-box boundaries to include a portion of the letter-box area including the computer graphics interface in the image area defined by the global letter-box boundaries.

21. A display apparatus to display an input image having an image area and a letter-box area on a screen, comprising:
   a computer graphics interface (CGI) detecting unit to detect a position of a CGI in a letter-box area of an input image;
   a letter-box detector to detect boundaries separating the letter-box area of the input image from the image area of the input image and to adjust the detected boundaries of the letter-box area according to the detected position of the CGI to include a portion of the letter-box area having the CGI in the image area; and
   an adjustment unit to adjust a size of the image area including the portion of the letter-box area having the CGI to fit on the screen.

22. A display apparatus to display sequentially input frames of an input image, comprising:
   a letter-box area detector to detect a letter-box area in each frame by detecting at least one of a number pixels in each line of each frame of a predetermined letter-box color and a number of consecutive pixels in each frame of the predetermined letter-box color;
   a computer graphics interface detecting unit to detect whether a computer graphics interface (CGI) exists in the detected letter-box area of each frame and to determine a position of the CGI in each frame; and
   a display unit to define a common image area for all of the frames of the input image based on the detected letter-box area in each frame and the determined position of the CGI in each frame and to display the common image area of each frame.

23. A method of displaying an image, comprising:
   detecting whether each pixel of each line of sequentially input frames of an input image is a black pixel of a letter-box area;
   counting a number of black pixels detected in each line;
   detecting a maximum value of consecutive black pixels in each line;
   detecting a boundary of the letter-box area in each frame using the number of black pixels counted and the maximum value detected in each line;
   determining final boundaries of the letter box-area by determining a line of the input image to be one of the boundaries of the letter-box area if the line is detected as a boundary of the letter-box area a predetermined number of times or more in the frames of the input image; and
   adjusting a size of the input image such that an image area within the finals boundaries of the letter-box area is fit to a size of a screen.

24. The method of claim 23, wherein if an absolute value of a difference value between a pixel average value of the letter-box area and a pixel value of a pixel is less than a first threshold value, the pixel is determined to be a black pixel of the letter-box area.

25. The method of claim 24, wherein the pixel average value of the letter-box area is one of a pixel average value of a line determined to be in the letter-box area, a pixel average value of a line having the maximum value of consecutive black pixels, and a predetermined value.

26. The method of claim 23, wherein if the maximum value of consecutive black pixels in a line is greater than or equal to a second threshold value and the number of black pixels in the line is greater than or equal to a third threshold value, the line is determined to be in the letter-box area.

27. The method of claim 23, further comprising:
detecting a boundary of a computer graphics interface in the letter-box area using at least one of the number of black pixels and the maximum value of consecutive black pixels of each line.

28. The method of claim 27, wherein the computer graphics interface comprises one of a caption and a logo.

29. The method of claim 27, wherein frequencies of lines of the input image detected as the boundaries of the letter-box area in the frames of the input image are detected to generate a histogram and a line having a frequency value greater than or equal to a predetermined value in the histogram is determined to be a boundary of the computer graphics interface.

30. The method of claim 29, wherein if one of upper and lower boundaries the letter-box area remains constant in the frames of the input image and the other one thereof changes in the frames of the input image, the position of a line furthest from the changing one of the upper and lower boundaries having the frequency value greater than or equal to the predetermined value is determined to be the boundary of the computer graphics interface.

31. The method of claim 29, wherein if an absolute value of a value obtained from subtracting the maximum value of consecutive black pixels in a line from a value obtained from subtracting a number of pixels corresponding to a size of the computer graphics interface from a total number of pixels of the line is less than a predetermined value, a position of the line is determined to be a boundary of the computer graphics interface.

32. The method of claim 27, wherein the number of black pixels counted in each line is compared with a predetermined threshold value to detect a line having the number of black pixels greater than the predetermined threshold value and positioned nearest to the image area with respect to other lines having the number of black pixels greater than the predetermined threshold value as a boundary of the computer graphics interface.

33. The method of claim 27, wherein if the computer graphics interface is detected and the computer graphics interface is set to be displayed, the boundary of the computer graphics interface is determined to be one of the final boundaries of the letter-box area.

34. A method of displaying an image, comprising:
transforming a color space of an input image into a color space representing a predetermined color of a letter-box area;
detecting whether each pixel of each line of sequentially input frames of the input image is a pixel of the predetermined color;
counting a number of pixels of the predetermined color detected in each line;
detecting a maximum value of consecutive pixels of the predetermined color in each line;
detecting a boundary of the letter-box area in each frame using the number of pixels counted and the maximum value of consecutive pixels of the predetermined color detected in each line;
determining final boundaries of the letter-box area by determining a line to be one of the final boundaries of the letter-box area if the line is detected as the boundary of the letter-box area a predetermined number of times or more in the frames of the input image; and
adjusting a size of the input image such that an image area within the final boundaries of the letter-box area is fit to a size of a screen.

35. A method of displaying an image, comprising:
detecting a local image area and a local letter-box area of each frame of an input image by determining whether each line of each frame is in the local letter-box area based on a color of each pixel in each line;
determining a global image area and a global letter-box area of the input image according to the detected local image areas and the detected local letter-box areas of each frame of the input image; and
adjusting a size of the global image area to fit to a screen and displaying the adjusted global image area on the screen.

36. The method of claim 35, wherein the detecting of the local image area and the local letter-box area of each frame comprises:
comparing a color value of each pixel of each line to a letter-box color value; and
counting a number of pixels in each line having substantially the same color value as the letter-box color value; and
determining a line to be in the local letter-box area if the number of pixels having substantially the same color as the letter-box color value is greater than or equal to a predetermined threshold value.

37. The method of claim 35, wherein the detecting of the local image area and the local letter-box area of each frame comprises:
comparing a color value of each pixel of each line to a letter-box color value; and
determining a maximum number of consecutive pixels having substantially the same color value as the letter-box color value in each line; and
determining a line to be in the local letter-box area if the maximum number of consecutive pixels having substantially the same color as the letter-box color value is greater than or equal to a predetermined threshold value.

38. The method of claim 35, wherein the determining of the global image area and the global letter-box area of the input image comprises:
determining lines of the input image to be boundaries between the global image area and the global letter-box area based a number of times each line is determined to be a local boundary separating the local image area and the local letter-box area in the frames of the input image.

39. The method of claim 35, wherein the determining of the global image area and the global letter-box area of the input image comprises:
determining boundaries to separate the global letter-box area and the global image area according to the detected local image areas and the detected letter-box areas of the frames of the input image;
detecting whether a computer graphics interface (CGI) exists in the global letter-box area;

detecting boundaries of the CGI in the global letter-box area when the CGI is detected in the global letter-box area; and adjusting the determined boundaries separating the global letter-box area and the global image area to include a portion of the global letter-box area having the CGI in the global image area.

40. A method of displaying an image having an image area and a letter-box area, comprising:

detecting a position of a computer graphics interface in the letter-box area of the image;

detecting boundaries separating the letter-box area and the image area of the image;

adjusting the detected boundaries to include the position of the computer graphics interface in the image area; and adjusting a size of the image area including the position of the computer graphics interface to fit a size of a screen and displaying the adjusted image area including the position of the computer graphics interface on the screen.

41. A method of displaying sequentially input frames of an input image, comprising:

determining a letter-box area in each frame by detecting at least one of a number pixels in each line of each frame of a predetermined letter-box color and a number of consecutive pixels in each frame of the predetermined letter-box color;

detecting whether a computer graphics interface (CGI) exists in the determined letter-box area of each frame and determining a position of the CGI in each frame; and defining a common image area for all of the frames of the input image based on the detected letter-box area in each frame and the determined position of the CGI in each frame and to display the common image area of each frame.

* * * * *